ered Dec. 25, 1956

2,775,581

METAL-CONTAINING AZO DYESTUFFS

Reinhard Neier and Charles Petitjean, Basel, and Walter Wehrli, Riehen, Switzerland, assignors to Sandoz A. G., Basel, Switzerland, a Swiss firm No Drawing. Application June 24, 1955,
Serial No. 517,916

Claims priority, application Switzerland June 25, 1954

6 Claims. (Cl. 260—145)

The present application is a continuation-in-part of the copending application Ser. No. 404,811, filed January 18, 1954, and relates to metal-containing azo dyestuffs.

A primary object of the invention is the embodiment of metal-containing azo dyestuffs, especially of compositions of matter consisting of such metal-containing azo dyestuffs which are suitable for the dyeing of wool, silk, leather and artificial nitrogenous fibers such as synthetic polyamide fibers (e. g. nylon, Perlon, etc.) from neutral to weakly acid dyebaths. This object is realized by the compositions of matter according to the invention consisting of at least one asymmetrical metal-containing azo dyestuff which corresponds to the formula

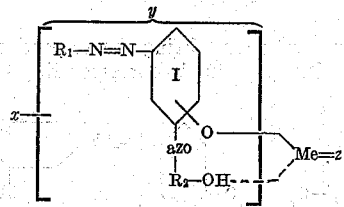

and the respective symmetrical metal-containing azo dyestuffs corresponding to the formulae $$y=Me=y \text{ and } z=Me=z$$

wherein $R_1$ stands for the radical of a diazo component of the benzene or naphthalene series, $R_2$—OH stands for the radical of an azo component of the hydroxybenzene, hydroxynaphthalene, pyrazolone, acetoacetic acid alkylamide or acetoacetic acid arylamide series, Me stands for a trivalent chromium or a trivalent cobalt atom, $x$ stands for at least one water-solubilising group from the series of the sulfonic acid, carboxyl, alkylsulfonyl, sulfonic acid amide, sulfonic acid lower alkylamide and sulfonic acid lower hydroxyalkylamide groups, $z$ stands for the radical of a disazo compound different from the radical $y$ but having the same general formula or the radical of a monoazo compound which corresponds to the formula $$R_3-N=N-R_4$$

wherein $R_3$ stands for the radical of a diazo compound of the benzene series, free from sulfonic acid groups and containing in the ortho-position to the N=N group a substituent capable of forming metal complex compounds, and $R_4$ stands for the radical of an azo compound of the hydroxybenzene, hydroxynaphthalene, pyrazolone, acetoacetic acid alkylamide, acetoacetic acid arylamide and 2-aminonaphthalene series, free from sulfonic acid groups and containing the N=N group in the ortho-position to the phenolic or enolic hydroxy group or amino group respectively, and wherein the two —O— atoms stand in the ortho-position to the —azo— group and the benzene nucleus I may bear further substituents.

The compositions of matter according to the invention are obtained when (a) Two or more different water-soluble disazo compounds obtainable according to the process described in the copending application Ser. No. 304,012, filed August 12, 1952, and corresponding to the formula

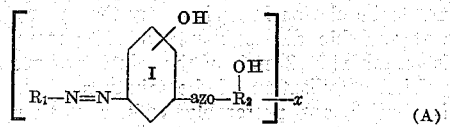

(A)

wherein the nucleus I may bear further substituents, e. g. alkyl groups, and $R_1$, $R_2$—OH and $x$ have the aforementioned significance, or when (b) One or more water-soluble disazo compounds corresponding to the general Formula A and one or more monoazo compounds corresponding to the general formula $$R_3-N=N-R_5-OH \qquad (B)$$

wherein $R_3$ has the above named significance and $R_5$—OH stands for the radical of an azo component of the hydroxybenzene, hydroxynaphthalene, pyrazolone, acetoacetic acid alkylamide or acetoacetic acid arylamide series, free from sulfonic acid groups and containing the OH groups in neighbouring position to the N=N group, or when (c) One or more water-soluble disazo compounds corresponding to the general Formula A and one or more monoazo compounds corresponding to the general formula $$R_3-N=N-R_6-NH_2 \qquad (C)$$

wherein $R_3$ has the above named significance and $R_6$—$NH_2$ stands for the radical of a 2-aminonaphthalene, free from sulfonic acid groups, are treated with metal-yielding agents, preferably with chromium- or cobalt-yielding agents.

The following aminobenzenes conforming to the present definition are enumerated as examples of those suitable for producing the monoazo compounds of general Formula B: 2-amino-1-hydroxybenzene, 2-amino-1-hydroxy - 4 - halogenbenzenes, 2 - amino - 1 - hydroxy - 4- nitrobenzene, 2 - amino - 1 - hydroxy - 4 - alkylsulfonyl- benzenes, 2 - amino - 1 - hydroxybenzene - 4 - or - 5- sulfonic acid amide, 2 - amino - 1 - hydroxy - 6 - halogen - or - 6 - alkyl - 4 - or - 5 - sulfonic acid amides, 2 -amino - 1 - hydroxy - 4 - halogenbenzene - 5 - or -6- sulfonic acid amides, the corresponding 2 - amino - 1- methoxybenzenes, also the 2 - aminobenzene - 1 - carbonic acid, 2 - amino - 5 - alkylsulfonylbenzene - 1 - carbonic acids, 2 - amino - 1 - carboxybenzene - 4- or -5- sulfonic acid amide, 2 - amino - 1 - carboxymethoxy- benzene-4- or -5-sulfonic acid amide. The aminobenzene sulfonic acid amides here named may be substituted on the nitrogen atom of the sulfonic acid amide group by alkyl, hydroxyalkyl, methoxyalkyl, cycloalkyl, aralkyl and/or aryl radicals which may themselves contain further substituents. Suitable azo components are for example: (a) hydroxybenzenes such as 1-hydroxy- 4 - alkylbenzenes, 1 - hydroxy - 2.4 - dialkylbenzenes, 1- hydroxy - 2 - acylaminobenzenes; (b) hydroxynaphthalenes such as 2 - hydroxynaphthalene, 1.5-, 2.6- or 2.7- dihydroxynaphthalene, 2 - hydroxynaphthalenes substituted in the 6- or 7-position by low-molecular alkyl, alkoxy, methylsulfonyl groups or halogen atoms, 2-hydroxynaphthalene -4-, -5-, -6- or -7-sulfonic acid amide and its derivatives, 1-acylamino-6- or -7-hydroxynaphthalenes substituted on the nitrogen atom; (c) pyrazolones such as 1-aryl-3-alkyl-5-pyrazolones and their derivatives carrying further substituents in the aryl nucleus, 1-aryl-5-pyrazolone-3-carbonic acids or carbonic acid amides; (d) acetoacetylaminoalkanes, - benzenes or -naphthalenes.

Suitable monoazo compounds of general Formula C are e. g. the products obtained by coupling the diazo components named in the preceding paragraph with 2-aminonaphthalene, 2-aminoalkylsulfonylnaphthalenes or 2-aminonaphthalene sulfonic acid amides.

For converting into the metal complex compounds, the mixtures of the disazo compounds of general Formula A and the monoazo compounds of general Formula B or C are to be chosen in such a way that at least 1 mol of a water-soluble disazo compound of general Formula A is contained in 2 mols of the mixture of azo components.

The metallisation of the mixtures of azo components is carried out preferably with chromium salts, e. g. chromic fluoride, chromic sulfate, chromic acetate, chromic formiate, chromic potassium sulfate or chromic ammonium sulfate, or with cobalt salts, e. g. cobaltous acetate, cobaltous formiate or cobaltous sulfate, in aqueous suspension or solution or in an organic medium, e. g. in formamide or in the molten liquid of an alkaline salt of a low-molecular aliphatic monocarbonic acid. Metallisation can be carried out very advantageously in an aqueous or alkaline medium, in which the chromium salts are applied in the presence of compounds which are capable of combining in an alkaline medium with the other components present to form soluble complex compounds, e. g. tartaric, citric or lactic acid. Chromates, e. g. sodium chromate, potassium chromate or potassium bichromate, may also be employed to excellent effect for the metallisation of the azo compounds; for this purpose a strongly alkaline medium, possibly containing additions of reducing substances, is used. In cases where the azo compounds contain the methoxy group as a complex-forming group, metallisation is carried out preferably in organic solvents, e. g. glycols such as ethylene glycol, ethyl polyglycol, butyl polyglycol, and in the presence of acid-binding agents, for example sodium acetate.

The resulting metalliferous azo dyestuffs are precipitated from aqueous solution, if necessary after pouring the organic metallising solution into water, and are filtered off, if need be washed, and finally dried.

The mixtures of metalliferous azo dyestuffs obtained according to the present invention are readily soluble in water and dye wool, leather and synthetic nitrogenous fibers in clear shades of very good fastness to light, washing and milling. In comparison with the pure symmetrical metal complex compounds of disazo dyestuffs corresponding to general Formula A, the mixed metal complex compounds described here are chaarcterised by more interesting shades, e. g. clear greens and browns.

The following examples illustrate the invention without limiting its scope. All parts and percentages are by weight; temperatures are in degrees centigrade.

EXAMPLE 1

28.9 parts of the disazo compound obtained by coupling diazotised 3-amino-4-hydroxy-1.1'-azobenzene-3'-sulfonic acid amide with 1-carbo-(2'-ethoxy)-ethoxy-amino-7-hydroxynaphthalene and 17.8 parts of the monoazo compound obtained by coupling diazotised 2-aminobenzene - 1 - carbonic acid with 1 - (3' - chloro)-phenyl-3-methyl-5-pyrazolone are mixed with 6 parts of sodium hydroxide in 1200 parts of water. To this are added 250 parts of a 15% aqueous solution of 1-hydroxybenzene-2-sodium carbonate containing 2.6 parts of chromium in complex combination. The mixture is boiled in a reflux condenser until the starting compounds are no longer indicated. The chromium complex compound thus formed is precipitated from the solution by addition of sodium chloride, and is then filtered off, dried and ground. It consists of a mixture of chromium-containing azo dyestuffs, the integrative component of which is the asymmetrical 1:2 chromium complex compound corresponding to the formula

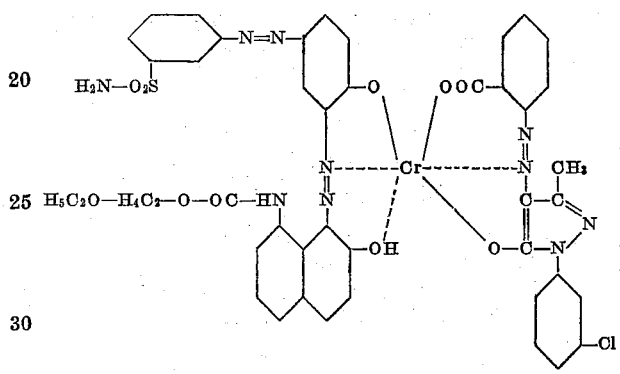

and the other components being the respective symmetrical 1:2 complex compounds corresponding to the formulae

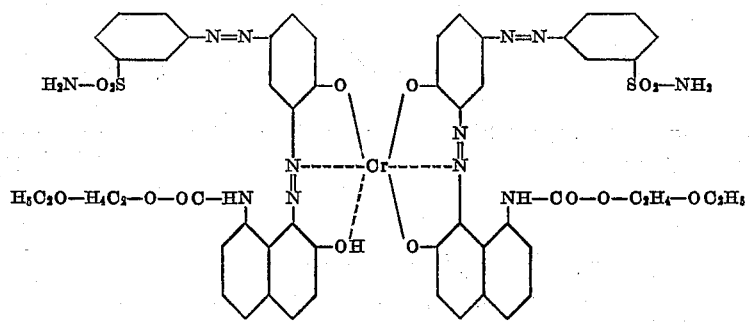

and

It is a dark-colored powder which dyes wool, silk, leather and synthetic polyamide and polyurethane fibers in grass-green shades.

The aqueous solution of the chromium complex compound of 1-hydroxybenzene-2-sodium carbonate is obtained in the following way: 28.9 parts of chromic ammonium sulfate, corresponding to 7.6 parts of chromo-(III)-oxide, are dissolved in 150 parts of water at 40°.

After an addition of 2 parts of sodium hydroxide the mass is agitated until the precipitate produced at the start has been re-dissolved. Then 27.6 parts of 1-hydroxybenzene-2-carbonic acid are stirred in and the temperature raised to 90°. The pH value of the mixture is adjusted to 8 by an addition of about 15 parts of sodium hydroxide, upon which the mass dissolves to give a solution of dark-green color. The volume is made up to 250 parts and the solution allowed to cool.

EXAMPLE 2

22.3 parts of the disazo compound obtained by coupling diazotised 3-amino-2-hydroxy-5-methyl-1.1′-azobenzene-3′-sulfonic acid amide with 2-hydroxynaphthalene and 17.8 parts of the monoazo compound produced from diazotised 2-amino-1-hydroxy-4-cholorobenzene and 1-acetylamino-7-hydroxynaphthalene are mixed in 300 parts of formamide. After an addition of 25 parts of chromic ammonium sulfate the suspension is heated to 90–100° until such time as a solution is formed in which the starting compounds are no longer indicated. The chromium complex compound so formed is precipitated by diluting the mixture with 600 parts of a 20% sodium chloride solution, filtered off, dried and ground. It consists of a mixture of chromium-containing azo dyestuffs, the integrative component of which is the asymmetrical 1:2 chromium complex compound corresponding to the formula

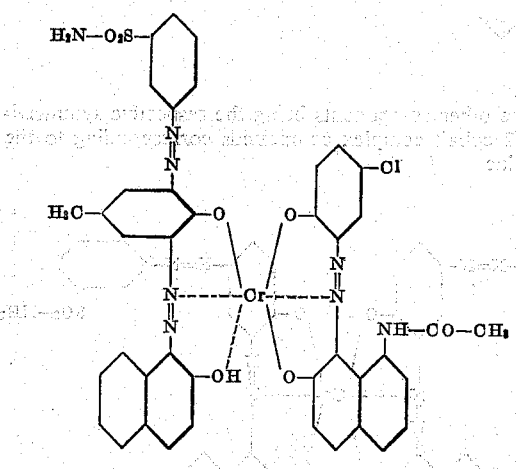

and the other components being the respective symmetrical 1:2 chromium complex compounds corresponding to the formulae

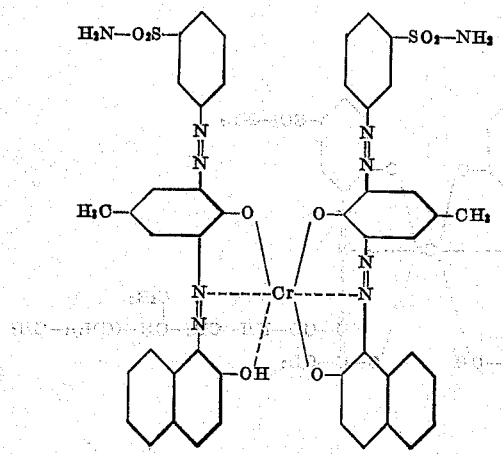

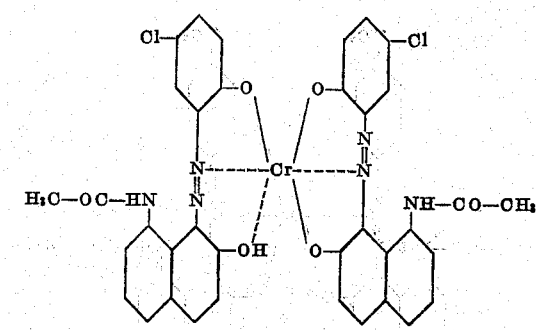

It is a dark-colored powder which dyes wool, leather and synthetic polyamide and polyurethane fibers in blue shades.

EXAMPLE 3

22.3 parts of the disazo compound of diazotised 3-amino-2-hydroxy-5 - methyl - 1.1′ - azobenzene-3′-sulfonic acid amide and 2-hydroxynaphthalene, 18.3 parts of the monoazo compound obtained by coupling diazotised 2-amino-1-hydroxy-5-nitrobenzene with 1-acetylamino-7-hydoxynaphthalene, and 8 parts of sodium hydroxide are brought into a fine dispersion in 1000 parts of water at 70°. A mixture of 14.2 parts of crystallised cobaltous sulfate, 130 parts of a 3% aqueous tartaric acid solution and 18.4 parts of a 30% sodium hydroxide solution are added dropwise. After 30 minutes' agitation the cobalt complex compound thus formed is precipitated by an addition of sodium chloride, and is then filtered off, dried and ground. It consists of a mixture of cobalt-containing azo dyestuffs, the integrative component of which is the asymmetrical 1:2 cobalt complex compound corresponding to the formula

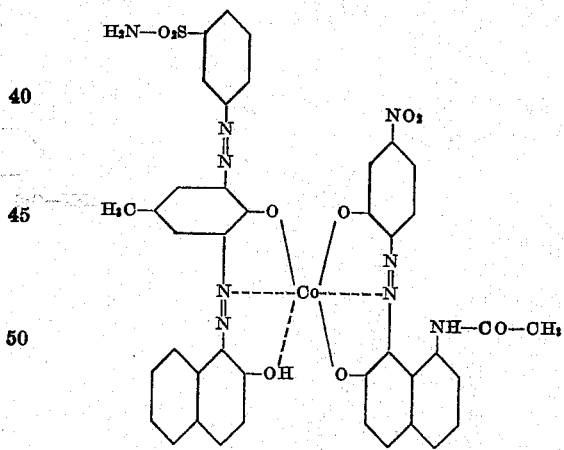

and the other components being the respective symmetrical 1:2 cobalt complex compounds corresponding to the formulae

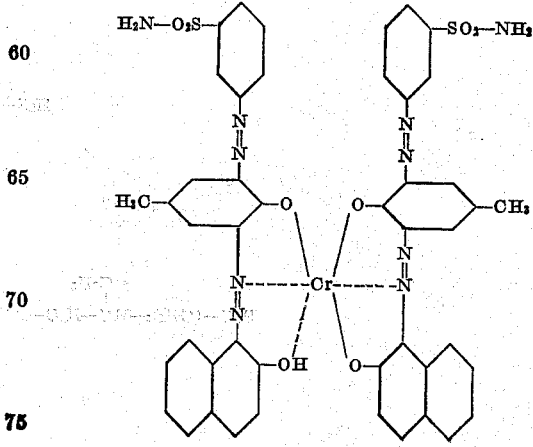

and

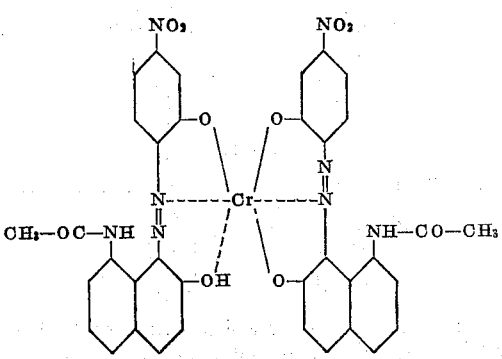

EXAMPLE 4

22.3 parts of the disazo compound obtained by coupling diazotised 3-amino-4-hydroxy-1.1'-azobenzene-3'-sulfonic acid amide with 2-hydroxynaphthalene and 20.6 parts of monoazo compound obtained from diazotised 2-amino-1-hydroxybenzene-4-sulfonic acid amide and 1-acetoacetyl-amino-2-ethylhexane are dissolved with 4 parts of sodium hydroxide in 2000 parts of water at 80°. 10 parts of sodium acetate and 15 parts of crystallised cobaltous sulfate are subsequently added and the mass stirred until the starting compounds are no longer indicated. The cobalt complex compound so formed is precipitated from the solution by an addition of sodium chloride, and is subsequently filtered off, dried and ground. It consists of a mixture of cobalt-containing azo dyestuffs, the integrative component of which is the asymmetrical 1:2 cobalt complex compound corresponding to the formula

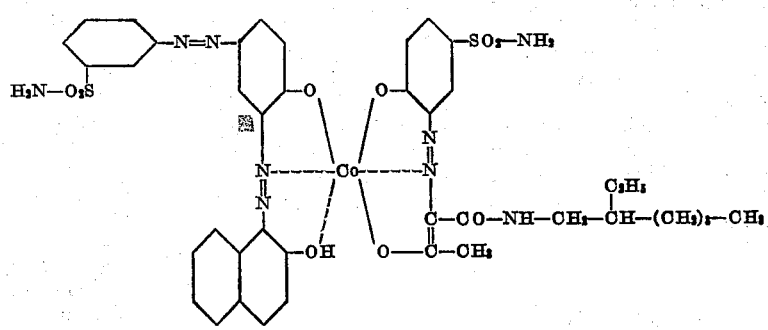

and the other components being the respective symmetrical 1:2 cobalt complex compounds corresponding to the formulae

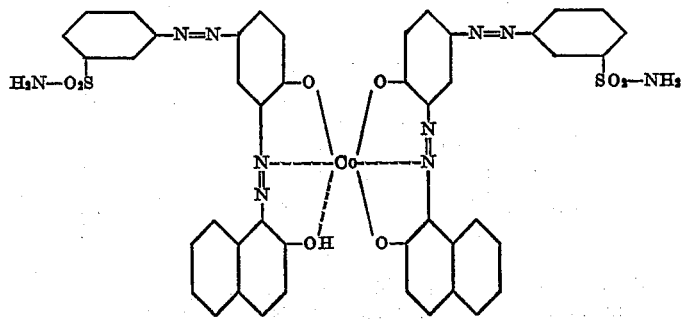

and

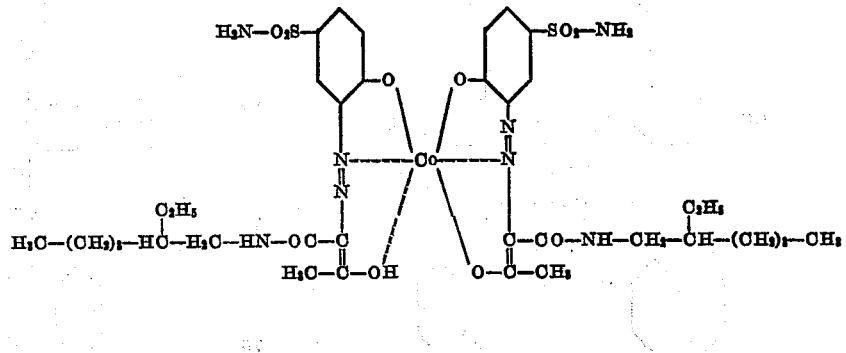

It is a brown-colored powder which dyes wool, silk, leather and synthetic polyamide fibers in yellow-brown shades.

EXAMPLE 5

24.9 parts of the disazo compound obtained by coupling diazotised 1-(3'-amino-4'-hydroxy)-phenyl-azonaphthalene-4-sulfonic acid with 2-hydroxynaphthalene and 17.6 parts of the monoazo compound obtained from diazotised 2-amino-1-hydroxy-4-chlorobenzene and 1-acetyl-amino-7-hydroxynaphthalene are stirred into 300 parts of formamide. After an addition of 25 parts of chromic ammonium sulfate the suspension is heated at 90–100° until such time as the starting compounds are no longer indicated. The resulting chromium complex compound is precipitated by diluting the mixture with 500 parts of a 20% aqueous solution of sodium chloride. Upon filtering the product is dissolved in 1500 parts of water containing 10 parts of sodium hydroxide, precipitated with 160 parts of sodium chloride, purified by subsequent filtration, dried on ground. It consists of a mixture of chromium-containing azo dyestuffs, the integrative component of which is the asymmetrical 1:2 chromium complex compound corresponding to the formula

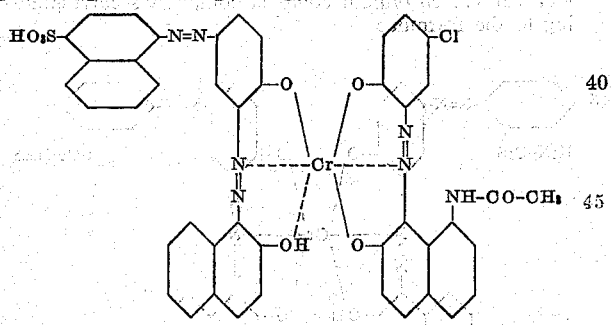

and the other components being the respective symmetrical 1:2 chromium complex compounds corresponding to the formulae

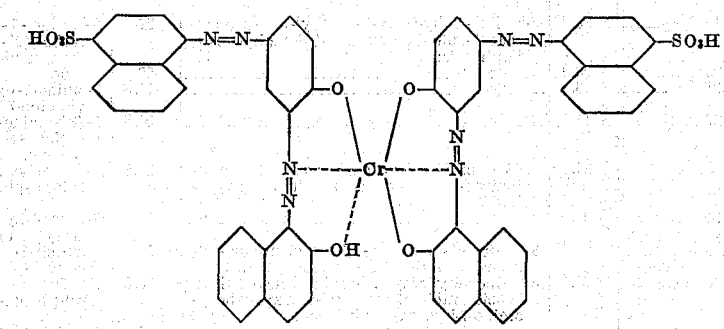

and

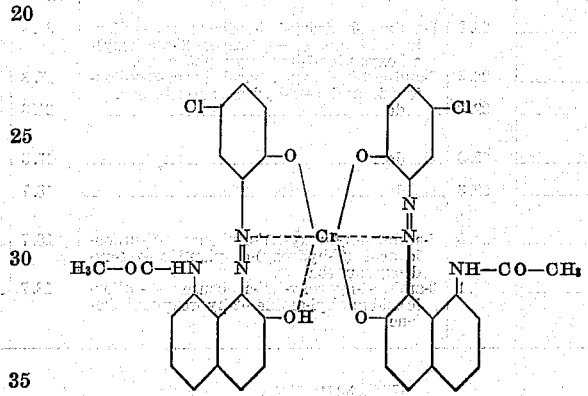

It is a dark colored powder which dyes wool, silk, leather and synthetic polyamide fibers in black shades.

In the following table a series of further metalliferous azo dyestuffs are listed which can be produced by one of the processes described above. In columns (I) and (III) the parts by weight of the azo compounds used for mixed metallisation are given, and in columns (II) and (IV) the azo compounds. In column (V) the complex-bound metal is indicated, and in (VI) the shade of wool dyeings of the metalliferous azo dyestuffs.

Table

| Example No. | (I) | (II) | (III) | (IV) | (V) | (VI) |
|---|---|---|---|---|---|---|
| 6 | 28.9 | 3-amino-4-hydroxy-1.1'-azobenzene-3'-sulfonic acid amide → 1-carbo-(2'-ethoxy)-ethoxyamino-7-hydroxynaphthalene. | 16.6 | 2-aminobenzene-1-carbonic acid → 1-phenyl-3-methyl-5-pyrazolone. | Cr | green. |
| 7 | 28.9 | ...do... | 17.8 | 2-aminobenzene-1-carbonic acid → 1-acetoacetylamino-2-methoxybenzene. | Cr | Do. |
| 8 | 28.9 | ...do... | 20.2 | 2-amino-1-hydroxy-benzene-4-sulfonic acid phenylamide → 2-aminonaphthalene. | Cr | grayish green. |
| 9 | 28.9 | ...do... | 21.6 | 3-amino-4-hydroxy-1.1'-azobenzene-3'-sulfonic acid amide → 2-hydroxynaphthalene. | Co | brownish olive. |
| 10 | 28.9 | ...do... | 24.9 | 1-(3'-amino-4'-hydroxy)-phenyl-azonaphthalene-6-sulfonic acid → 2-hydroxynaphthalene. | Co | Do. |
| 11 | 22.3 | 3-amino-4-hydroxy-1.1'-azobenzene-3'-sulfonic acid amide → 2-hydroxynaphthalene. | 18.3 | 2-amino-1-hydroxy-4-nitrobenzene → 1-acetylamino-7-hydroxynaphthalene. | Cr | gray. |
| 12 | 22.3 | ...do... | 7.5 | 2-amino-1-hydroxy-4-chlorobenzene → 2-aminonaphthalene. | Co | brown. |
| 13 | 22.3 | ...do... | 11.9 | 3-amino-4-hydroxy-1.1'-azobenzene-3'-sulfonic acid amide → 1-phenyl-3-methyl-5-pyrazolone. | Cr | Do. |
| 14 | 22.3 | ...do... | 11.1 | 3-amino-2-hydroxy-5-methyl-1.1'-azobenzene-3'-sulfonic acid amide → 2-hydroxynaphthalene. | Co | Do. |
| 15 | 23.1 | 3-amino-2-hydroxy-5-methyl-1,1'-azobenzene-3'-sulfonic acid amide → 2-hydroxynaphthalene. | 20 | 2-amino-1-hydroxy-4-chloro-5-nitrobenzene → 1-acetylamino-7-hydroxynaphthalene. | Co | blue. |
| 16 | 23.1 | ...do... | 16.5 | 2-amino-1-hydroxy-4-chloro-5-nitrobenzene → 2-hydroxynaphthalene. | Cr | Do. |
| 17 | 23.1 | ...do... | 15 | 2-amino-1-hydroxy-4-chlorobenzene → 2-hydroxynaphthalene. | Cr | blueish violet. |
| 18 | 23.1 | ...do... | 15 | ...do... | Co | violet. |

Table—Continued

| Example No. | (I) | (II) | (III) | (IV) | (V) | (VI) |
|---|---|---|---|---|---|---|
| 19 | 23.1 | 3-amino-2-hydroxy-5-methyl-1,1'-azobenzene-3'-sulfonic acid amide → 2-hydroxynaphthalene. | 22 | 2-amino-1-hydroxy-5-nitrobenzene→1-carbo-(2'-propoxy)-ethoxyamino-7-hydroxynaphthalene. | Cr | blue. |
| 20 | 23.1 | ...do... | 22 | ...do... | Co | Do. |
| 21 | 23.1 | ...do... | 18.3 | 2-amino-1-hydroxy-4-nitrobenzene→1-acetylamino-7-hydroxynaphthalene. | Cr | greenish blue. |
| 22 | 11.2 | ...do... | 24.9 | 1-(3'-amino-4'-hydroxy)-phenyl-azonaphthalene-4-sulfonic acid→2-hydroxynaphthalene. | Co | brown. |
| 23 | 24.9 | 1-(3'-amino-4'-hydroxy)-phenyl-azonaphthalene-4-sulfonic acid→2-hydroxynaphthalene. | 17.8 | 2-aminobenzene-1-carbonic acid→1-(3'-chloro)-phenyl-3-methyl-5-pyrazolone. | Cr | Do. |
| 24 | 24.9 | ...do... | 20 | 2-amino-1-hydroxy-4-chloro-5-nitrobenzene→1-acetylamino-7-hydroxynaphthalene. | Cr | Do. |
| 25 | 21.1 | 3-amino-4-hydroxy-1.1'-azobenzene→2-hydroxynaphthalene-4-sulfonic acid. | 16.9 | 2-amino-1-hydroxy-4-nitrobenzene→1-(3'-chloro)-phenyl-3-methyl-5-pyrazolone. | Cr | Do. |
| 26 | 28.9 | 3-amino-4-hydroxy-1,1'-azobenzene-3'-sulfonic acid amide→1-carbo-(2'-ethoxy)-ethoxyamino-7-hydroxynaphthalene. | 13.3 | 2-aminobenzene-1-carbonic acid → 1-(3'-chloro)-phenyl-3-methyl-5-pyrazolone. | Cr | green. |
|  |  |  | 6 | 2-amino-1-carboxybenzene-5-sulfonic acid phenylamide→1-(3'-chloro)-phenyl-3-methyl-5-pyrazolone. |  |  |
| 27 | 28.9 | 3-amino-4-hydroxy-1,1'-azobenzene-3'-sulfonic acid amide → 1-carbo-(2'-methoxy)-ethoxyamino-7-hydroxynaphthalene. | 34.8 | 2-amino-1-hydroxy-4-nitrobenzene → 1-acetoacetylaminohexane. | Co | brown. |
| 28 | 22.3 | 3-amino-4-hydroxy-1,1'-azobenzene-3'-sulfonic acid amide→2-hydroxynaphthalene. | 17.8 | 2-amino-1-hydroxy-4-chlorobenzene → 1-acetylamino-7-hydroxynaphthalene. | Cr | black. |
| 29 | 22.3 | ...do... | 21.8 | 2-amino-1-hydroxybenzene-4-sulfonic acid dimethylamide→1-acetylamino-7-hydroxynaphthalene. | Cr | Do. |
| 30 | 22.3 | ...do... | 17.8 | 2-aminobenzene-1-carbonic acid→1-(3'-chloro)-phenyl-3-methyl-5-pyrazolone. | Cr | khaki. |
| 31 | 22.3 | ...do... | 18.7 | 2-amino-1-carboxybenzene-5-sulfonic acid methylamide→1-phenyl-3-methyl-5-pyrazolone. | Cr | Do. |
| 32 | 24.6 | 3-amino-4-hydroxy-1,1'-azobenzene-3'-sulfonic acid (2'-hydroxy)-ethylamide → 2-hydroxynaphthalene. | 18.7 | ...do... | Cr | Do. |
| 33 | 23.1 | 3-amino-4-hydroxy-1,1'-azobenzene-4'-sulfonic acid methyl-amide→2-hydroxynaphthalene. | 18.7 | ...do... | Cr | Do. |

EXAMPLE 34

50 parts of wool in hank form, well wetted out, are entered into a solution of 0.5 part of the concentrated chromiferous dyestuff obtained according to Example 1 in 1500 parts of water at 40°, contained in a porcelain beaker of 2 litres capacity. The bath is heated to boiling point over 30 minutes, the material being turned frequently. After a further 30 minutes at the boil the dyebath is given 0.5 part of acetic acid 10% and the wool dyed for about 30 minutes at boiling temperature until the dyestuff has completely exhausted onto the fiber. The wool hank is then removed, rinsed well in cold water and dried. It is dyed in a green shade.

When 50 parts of yarn of nylon in hank form is used instead of wool, and the dyestuff applied in the same way, a green shade is obtained on complete exhaustion of the dyebath.

A representative mixture of metal-containing azo dyestuffs is that of Example 30 the integrative component of which mixture is the asymmetrical 1:2 chromium complex compound corresponding to the formula and the other components being the respective symmetrical 1:2 chromium complex compounds corresponding to the formulae

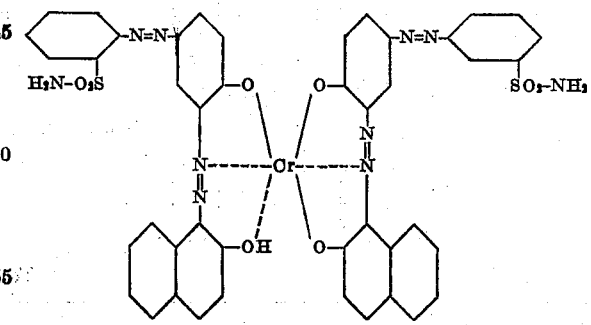

and

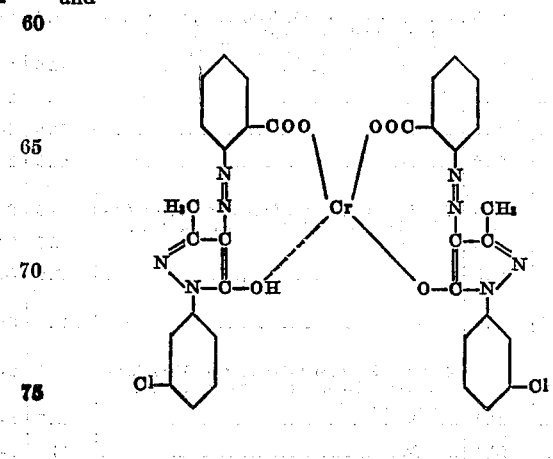

We claim:
1. A composition of matter consisting of at least one asymmetrical metal-containing azo dyestuff corresponding to the formula

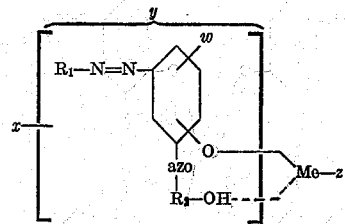

and the respective symmetrical metal-containing azo dyestuffs corresponding to the formulae $$y=Me=y \text{ and } z=Me=z$$

wherein $R_1$ stands for the radical of a diazo component selected from the group consisting of the benzene and naphthalene series,
$R_2$—OH stands for the radical of an azo component selected from the group consisting of hydroxybenzenes, hydroxynaphthalenes, pyrazolones, acetoacetic acid alkylamides and acetoacetic acid arylamides,
Me stands for a trivalent metal atom selected from the group consisting of a trivalent chromium atom and a trivalent cobalt atom,
$w$ stands for a member selected from the group consisting of hydrogen and methyl,
$x$ stands for at least one water-solubilising group selected from the group consisting of sulfonic acid, carboxyl, alkylsulfonyl, sulfonic acid amide, sulfonic acid lower alkylamide and sulfonic acid lower hydroxyalkylamide groups,
$z$ stands for a radical selected from the group consisting of the radical of a disazo compound different from the radical $y$ but having the same general formula and the radical of a monoazo compound which corresponds to the formula $$R_3—N=N—R_4$$

wherein $R_3$ stands for the radical of a diazo component of the benzene series, free from sulfonic acid groups and containing in the ortho-position to the N=N group a substituent capable of forming metal complex compounds, and $R_4$ stands for the radical of an azo component selected from the group consisting of hydroxybenzenes, hydroxynaphthalenes, parazolones, acetoacetic acid alkylamides, acetoacetic acid arylamides and 2-aminonaphthalenes, free from sulfonic acid groups and containing the N=N group in neighbouring position to the phenolic and enolic hydroxy group and the amino group respectively, and wherein the two —O— atoms stand in ortho-position to the -azo-group.

2. The composition of matter consisting of the asymmetrical chromium-containing azo dyestuff corresponding to the formula

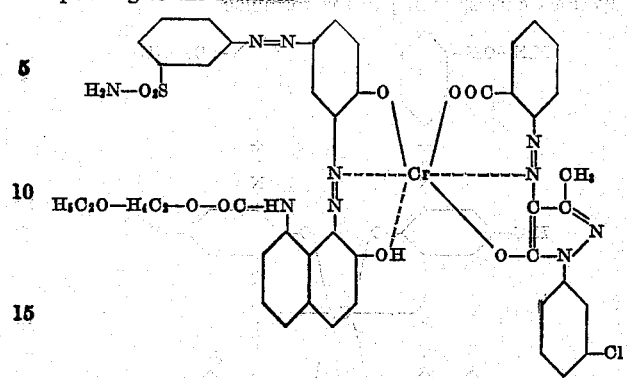

and the respective symmetrical chromium-containing azo dyestuffs corresponding to the formulae

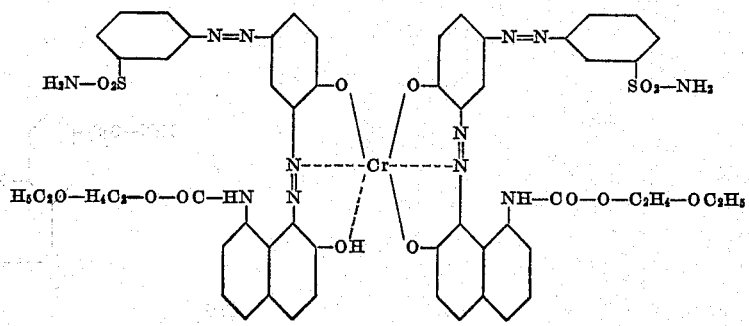

and

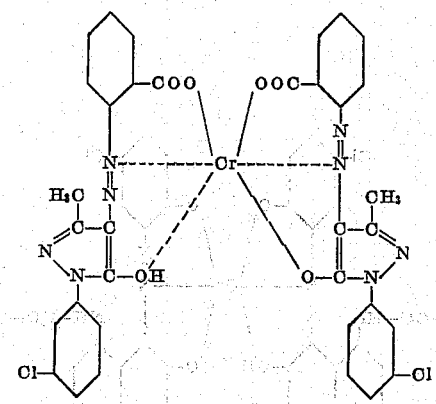

3. The composition of matter consisting of the asymmetrical chromium-containing azo dyestuff corresponding to the formula

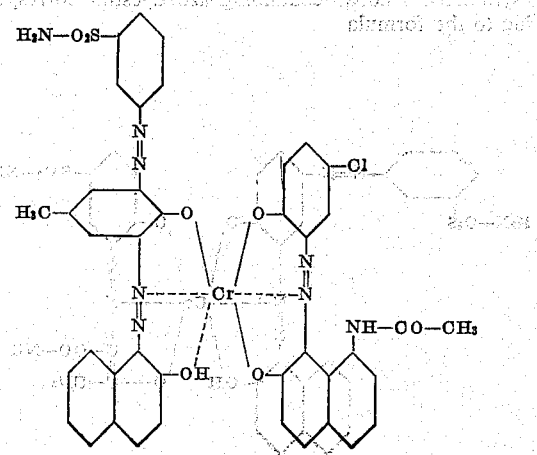

and the respective symmetrical chromium-containing azo dyestuffs corresponding to the formulae

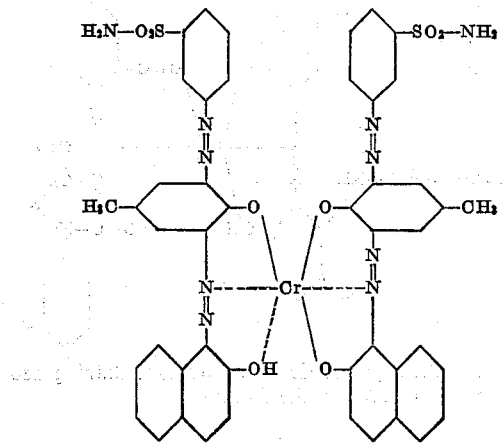

and

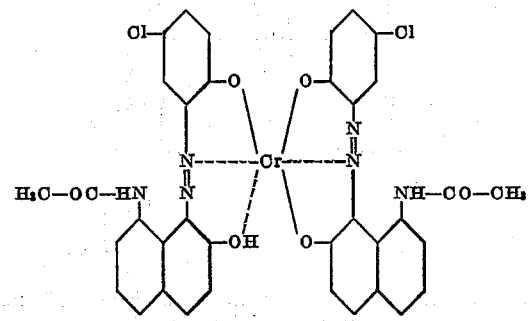

4. The composition of matter consisting of the asymmetrical cobalt-containing azo dyestuff corresponding to the formula

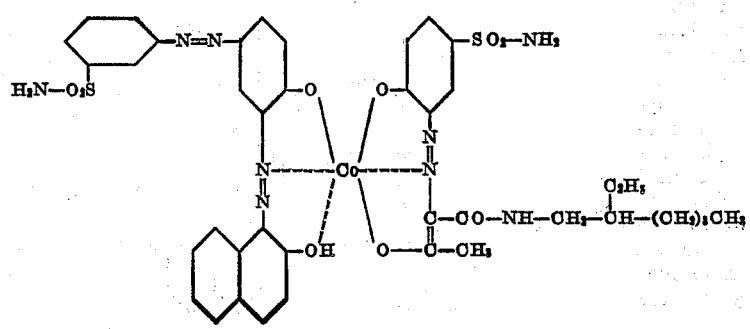

and the respective symmetrical cobalt-containing azo dyestuffs corresponding to the formulae

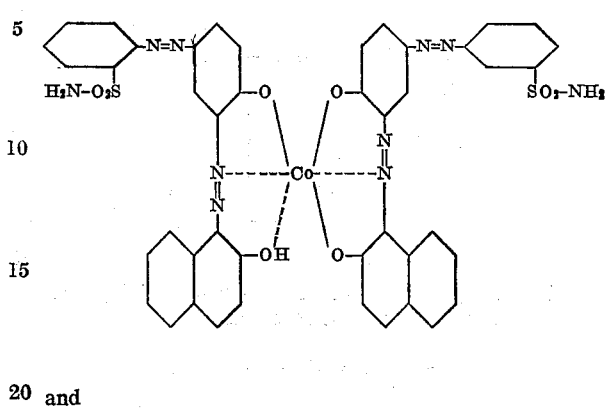

and

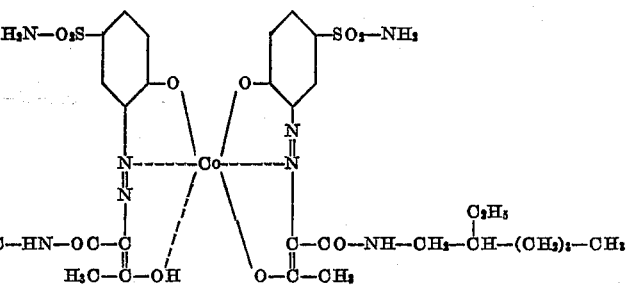

5. The composition of matter consisting of the asymmetrical chromium-containing azo dyestuff corresponding to the formula

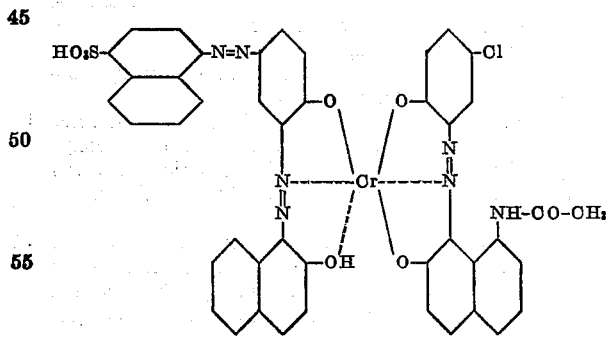

and the respective symmetrical chromium-containing azo dyestuffs corresponding to the formulae
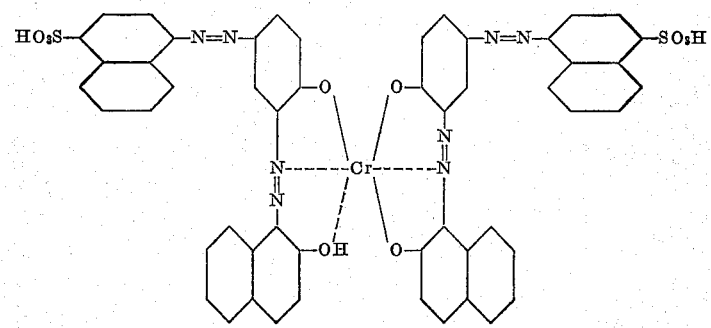
and
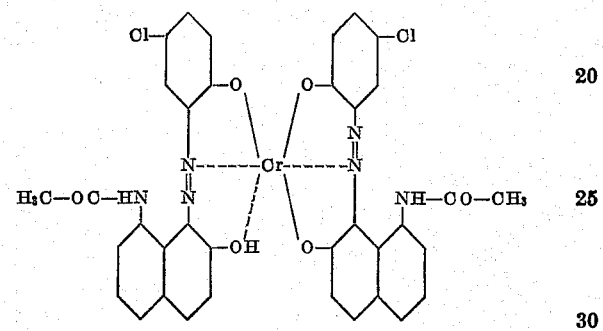
6. The composition of matter consisting of the asymmetrical chromium-containing azo dyestuff corresponding to the formula
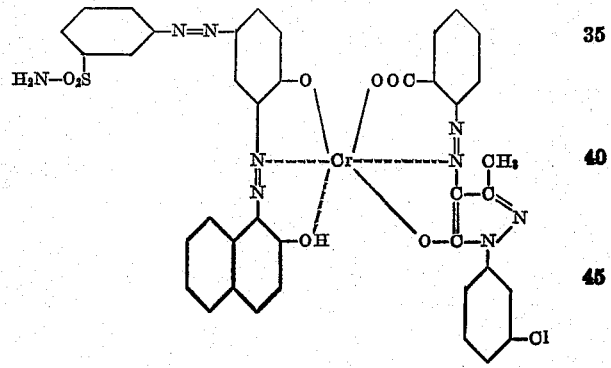
and the respective symmetrical chromium-containing azo dyestuffs corresponding to the formulae
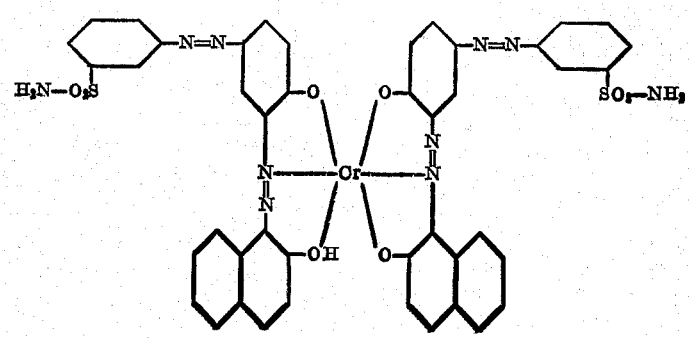
and
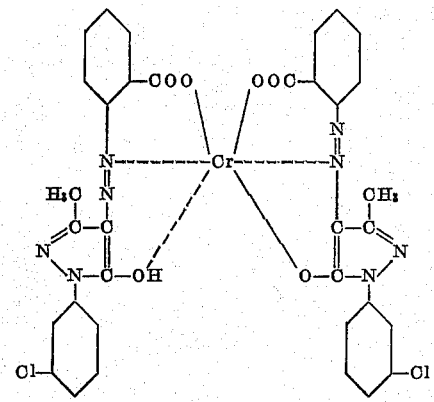
No references cited.